United States Patent [19]
Foster et al.

[11] Patent Number: 5,798,427
[45] Date of Patent: Aug. 25, 1998

[54] ETHYLENE POLYMERS HAVING ENHANCED PROCESSABILITY

[75] Inventors: George Norris Foster, Bloomsbury; Tong Chen, Neshanic Station; Scott Hanley Wasserman, Bridgewater, all of N.J.; Day-Chyuan Lee, Doylestown, Pa.; Stuart Jacob Kurtz, Martinsville, N.J.; Laurence Herbert Gross, Bridgewater, N.J.; Robert Harold Vogel, Ringoes, N.J.

[73] Assignee: Union Carbide Chemicals & Plastics Technology Corporation, Danbury, Conn.

[21] Appl. No.: 728,848

[22] Filed: Oct. 10, 1996

Related U.S. Application Data

[63] Continuation of Ser. No. 442,453, May 16, 1995, abandoned.

[51] Int. Cl.$^6$ .................. G08F 10/02; G08F 10/04; G08F 10/14
[52] U.S. Cl. .................. 526/352; 526/127; 526/129; 526/160; 526/348; 526/348.2; 526/348.4; 526/348.5; 526/348.6; 526/901
[58] Field of Search .................. 526/348.6, 352, 526/348, 348.2, 348.4, 348.5

[56] References Cited

U.S. PATENT DOCUMENTS

| | | | |
|---|---|---|---|
| 4,794,096 | 12/1988 | Ewen | 502/117 |
| 5,086,134 | 2/1992 | Antberg et al. | 526/160 |
| 5,216,095 | 6/1993 | Dolle et al. | 526/127 |
| 5,272,236 | 12/1993 | Lai et al. | 526/348.5 |
| 5,278,264 | 1/1994 | Spaleck et al. | 526/352 |
| 5,278,272 | 1/1994 | Lai et al. | 526/348.5 |
| 5,304,614 | 4/1994 | Winter et al. | 526/127 |
| 5,314,973 | 5/1994 | Welborn, Jr. | 526/126 |
| 5,350,817 | 9/1994 | Winter et al. | 526/118 |
| 5,374,700 | 12/1994 | Tsutsui et al. | 526/348.3 |
| 5,380,810 | 1/1995 | Lai et al. | 526/352 |
| 5,395,471 | 3/1995 | Obijeski et al. | |
| 5,420,220 | 5/1995 | Cheruvu et al. | |
| 5,459,217 | 10/1995 | Todo et al. | 526/348.6 |
| 5,565,533 | 10/1996 | Galimberti et al. | 526/160 |

FOREIGN PATENT DOCUMENTS

| | | |
|---|---|---|
| 9308221 | 4/1993 | WIPO. |
| 9407930 | 4/1994 | WIPO. |
| 9428034 | 12/1994 | WIPO. |
| 9535333 | 6/1995 | WIPO. |

OTHER PUBLICATIONS

Coates, Geoffrey W. & Robert M. Waymouth, "Oscillating Stereocontrol: A Strategy for the Synthesis of Thermoplastic Elastomeric Polypropylene", Science, vol. 267, Jan. 13, 1995, pp. 217–219.

Diamond, Gary M., Stephan Rodewald & Richard F. Jordan, "Efficient Synthesis of rac–(Ethylenebis(indenyl)ZrX$_2$ Complexes via Amine Elimination", Organometallics, vol. 14, 1995, pp. 5–7.

Japanese Abstract WO 9419391 A assigned to Idemitsu Kosan Co., Ltd.

Spaleck, Walter, FRank Küber, Andreas Winter, Jürgen Rohrmann, Bernd Bachmann, Martin Antberg, Volker Dolle & Erich F. Paulus, "The Influence of Aromatic Substituents on the Polymerization Behavior of Bridged Zirconocene Catalysts", Organometallics, vol. 13, 1994, pp. 954–963.

Giardello, Michael A., Moris S. Eisen, Charlotte L. Stern & Tobin J. Marks," Chiral, Non–C$_2$ Symmetric Zirconocene Complexes as Catalysts for Stereoregular α–Olefin Polymerization", J. Am. Chem. Soc., vol. 115, 1993, pp. 3326–3327.

Ewen, John A., "Mechanisms of Stereochemical Control in Propylene Polymerization with Soluble Group 4B Metallocene/Methylalumoxane Catalysts", J. Am. Chem. Soc., vol. 106, 1984, pp. 6355–6364.

Kaminsky, Walter, Klaus Külper, Hans H. Brintzinger & Ferdinand R.W.P. Wild, "Polymerization of Propene and Butene with a Chiral Zirconocene and Methylalumoxane as Cocatalyst", Angrew. Chem. Int. Engl. 24, No. 6, 1985, pp. 507–508.

Wild, Ferdinand R.W.P., Laszlo Zsolnai, Gottfried Huttner & Hans H. Brintzinger, "Synthesis and Molecular Structures of Chiral ansa–Titanocene Derivatives with Bridged Tetrahydroindenyl Ligands", Journal of Organometallic Chemistry, vol. 232, 1982, pp. 233–247.

Primary Examiner—Edward J. Smith
Attorney, Agent, or Firm—S. H. Hegedus

[57] ABSTRACT

An ethylene polymer having a Polydispersity Index of at least about 3.0, a melt index, MI, and a Relaxation Spectrum Index, RSI, such that $(RSI)(MI^\alpha)$ is greater than about 26 when $\alpha$ is about 0.7, and a Crystallizable Chain Length Distribution Index, $L_w/L_n$, less than about 3 is provided. Such ethylene polymer has processability equivalent or superior to even conventional high pressure polyethylene at similar melt index, yet need not be made under high pressure reaction conditions.

18 Claims, 2 Drawing Sheets

ETHYLENE POLYMERS HAVING ENHANCED PROCESSABILITY

This application is a Continuation of prior U.S. application Ser. No. 08/442,453 Filing Date May 16, 1995 now abandoned.

This invention relates to ethylene polymers having enhanced processability, particularly extrudability, and a narrow comonomer distribution that may be advantageously made in a low pressure process. Melt extrusion properties of these ethylene polymers are superior to those of conventional linear low density polyethylene, and equivalent or superior to those of high pressure low density polyethylene at similar melt index.

BACKGROUND

Linear polyethylene may be readily made in low pressure processes, for instance in gas phase, fluidized bed reactors. Its mechanical properties, such as stiffness, tensile strength and elongation, are good. However, its processability is deficient. Linear polyethylene has a tendency to melt fracture and experience web instability problems such as high neck-in and draw resonance when made into films that are rolled.

High pressure low density polyethylene, which is highly branched, is preferred to linear low density polyethylene for applications that require processing ease. High pressure low density polyethylene may, for example, be readily extruded into films without suffering from melt fracture, overheating, or web instability problems. However, conventional processes for making such resins require tubular reactors or autoclaves that operate at extremely high pressure (on the order of 30,000 to 45,000 psi) and high temperature (about 200° to 350° C.), and are necessarily difficult and expensive to run. In addition, because of its highly branched nature, the mechanical properties of high pressure low density polyethylene are inferior to those of linear low density polyethylene.

Several workers in the field have attempted to address the issue of the poor processability of linear polyethylene by introducing long chain branching into linear polyethylene. U.S. Pat. Nos. 5,272,236; 5,380,810; and 5,278,272 to Lai et al. and PCT Application No. WO 93/08221, all assigned to The Dow Chemical Company, describe "substantially linear" olefin polymers having certain properties leading to enhanced processabililty, including about 0.01 to 3 long chain branches per 1000 main chain carbon atoms and a molecular weight distribution of about 1.5 to about 2.5.

Similarly, PCT Application No. WO 94/07930 assigned to Exxon Chemical Patents Inc. describes polymers having less than 5 long, linear branches per 1000 main chain carbon atoms with at least some of the branches having a molecular weight greater than the critical molecular weight for entanglement of the polymer. WO 94/07930 states that these polymers have superior processability as melts and superior mechanical properties as solids.

U.S. Pat. No. 5,374,700 to Tsutsui et al. describes ethylene copolymers said to have narrow compositional distributions and excellent melt tension. The so-called melt flow rates of these copolymers are from 0.001 to 50 g/10 min., as measured at a temperature of 190° C. and a load of 2.16 kg, i.e., the same as melt index.

Finally, PCT Application No. WO94/19381 assigned to Idemitsu Kosan Co., Ltd., relates to an ethylene copolymer derived from ethylene and a 3–20 carbon olefin said to have good processability and controllability with respect to various properties such as density, melting point and crystallinity. The copolymer is characterized by 1) the main chain of the polymer does not contain quaternary carbon, 2) the melt-flow activation energy (Ea) is 8–20 kcal/mol, and 3) when the Huggins constant k of the copolymer is compared to that of a linear polyethylene having the same limiting viscosity as the copolymer, the viscosity measurement being made in decalin at 135° C., the relationship is as follows: $1.12 < k1/k2 \leq 5$ (in which k1 is the Huggins constant of the copolymer and k2 is that of the linear polyethylene).

A new class of ethylene polymers having excellent processabililty that is equivalent to or exceeding that of high pressure low density polyethylene at similar melt index has been discovered. Such ethylene polymers possess a unique set of properties not found in prior art polyethylene resins.

SUMMARY OF THE INVENTION

The invention provides an ethylene polymer having a Polydispersity Index of at least about 3.0; a melt index, MI, and Relaxation Spectrum Index, RSI, such that $(RSI)(MI^\alpha)$ is greater than about 26 when $\alpha$ is about 0.7; and a Crystallizable Chain Length Distribution Index, Lw/Ln, less than about 3. The ethylene polymer is efficiently extruded showing lower head pressure and amperage than are conventional linear low density polyethylene or newer commercially available metallocene-made polyethylene. The ethylene polymer, which may be an ethylene homopolymer or interpolymer of ethylene, may be readily fabricated into a variety of useful articles such as general purpose filmes, clarity films, shrink films, extrusion coatings, wire and cable insulation and jacketing and cross-linked, power cable insulation, molded articles from injection, blow, or rotational molding, and semiconductive insulation and jacketing using methods well known in the art.

DETAILED DESCRIPTION OF THE INVENTION

Ethylene polymers of the invention include ethylene homopolymers, and interpolymers of ethylene and linear or branched higher alpha-olefins containing 3 to about 20 carbon atoms, with densities ranging from about 0.86 to about 0.95. Suitable higher alpha-olefins include, for example, propylene, 1-butene, 1-pentene, 1-hexene, 4-methyl-1-pentene, 1-octene and 3, 5, 5-trimethyl 1-hexene. Dienes, particularly non-conjugated dienes, may also be polymerized with the ethylene. Suitable non-conjugated dienes are linear, branched, or cyclic hydrocarbon dienes having from about 5 to about 20 carbon atoms. Especially preferred dienes include 1,5-hexadiene, 5-vinyl-2-norbornene, 1,7-octadiene and the like. Ethylene polymers also includes, for example, ethylene/propylene rubbers (EPR's), ethylene/propylene/diene terpolymers (EPDM's) and the like. Aromatic compounds having vinyl unsaturation, such as styrene and substituted styrenes, may be included as comonomers as well. Particularly preferred ethylene polymers comprise ethylene and 1 to about 40 percent by weight of one or more comonomers described above.

The ethylene polymers have Polydispersity Indices uncorrected for long chain branching of at least about 3.0, preferably at least about 4.0, indicating that these ethylene polymers have molecular weight distributions that are advantageously quite broad. The Polydispersity Index (PDI) of a polymer is defined as the ratio of the weight average molecular weight of the polymer to the number average molecular weight of the polymer ($M_w/M_n$). PDI, uncorrected for long chain branching, is determined using size exclusion chromatography (SEC) with a WATERS 150C GPC instrument operating at 140° C. with 1,2,4-trichlorobenzene at a flow rate of 1 ml/min. The pore size range of the column set provides for a MW separation covering the 200 to 10,000,000 Daltons range. National Institute of Standards Technology polyethylene standard NBS 1475 or 1496 is used as the calibration standard to obtain the uncorrected (linear polymer assumed) molecular weight distribution.

The present ethylene polymers have unique rheological properties that impart superior melt strength, shear-thinning behavior and excellent drawdown enabling them to process extremely easily. Such enhanced processability encompasses ease in both extrusion and fabrication processes, such as in blown film, blow molding, extrusion coating and wire and cable extrusion operations. In particular, the ethylene polymers have melt indexes, MI, and Relaxation Spectrum Indexes, RSI, such that, for a given ethylene polymer:

(RSI)(MI$^\alpha$)>about 26 when $\alpha$ is about 0.7.

Preferably, (RSI)(MI$^\alpha$)>about 30 when $\alpha$ is about 0.7.

In the formulae immediately above, MI is the melt index of the polymer reported as grams per 10 minutes, determined in accordance with ASTM D-1238, condition E, at 190° C., and RSI is the Relaxation Spectrum Index of the polymer in dimensionless units.

The RSI of the ethylene polymer is determined by first subjecting the ploymer to a shear deform ation and measuring its response to the deformation using a rheometer. As is known in the art, based on the response of the polymer and the mechanics and geometry of the rheometer used, the relaxation modulus G(t) or the dynamic moduli G'($\omega$) and G"($\omega$) may be determined as functions of time t or frequency $\omega$, respectively (See J. M. Dealy and K. F. Wissbrun, *Melt Rheolog and Its Role in Plastics Processing*, Van Nostrand Reinhold, 1990, pp.269–297). The mathematical connection between the dynamic and storage moduli is a Fourier transform integral relation, but one set of data may also be calculated from the other using the well known relaxation spectrum (See S. H. Wasserman, *J. Rheology*, Vol. 39, pp. 601–625 (1995)). Using a classical mechanical model a discrete relaxation spectrum consisting of a series of relaxations or "modes," each with a characteristic intensity or "weight" and relaxation time may be defined. Using such a spectrum, the moduli are re-expressed as:

$$G'(\omega) = \sum_{i=1}^{N} g_i \frac{(\omega\lambda_i)^2}{1+(\omega\lambda_i)^2}$$

$$G''(\omega) = \sum_{i=1}^{N} g_i \frac{\omega\lambda_i}{1+(\omega\lambda_i)^2}$$

$$G(t) = \sum_{i=1}^{N} g_i \exp(-t/\lambda_i)$$

where N is the number of modes and $g_i$ and $\lambda_i$ are the weight and time for each of the modes (See J. D. Ferry, *Viscoelastic Properties of Polymers*, John Wiley & Sons, 1980, pp. 224–263). A relaxation spectrum may be defined for the polymer using software such as IRIS® rheological software, which is commercially available from IRIS Development.

Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_{i=1}^{N} g_i / \sum_{i=1}^{N} g_i/\lambda_i$$

$$g_{II} = \sum_{i=1}^{N} g_i\lambda_i / \sum_{i=1}^{N} g_i$$

RSI is defined as $g_{II}/g_I$.

Because RSI is sensitive to such parameters as a polymer's molecular weight distribution, molecular weight, and long chain branching, it is a reliable indicator of the processability of a polymer. The higher the value of RSI, the better the processability of the polymer.

In addition, the ethylene polymers have a Crystallizable Chain Length Distribution Index, $L_w/L_n$, of less than about 3, preferably less than about 2, indicating that they have narrow comonomer distributions and therefore substantial compositional homogeneity. The Crystallizable Chain Length Distribution Index is determined using Temperature Rising Elution Fractionation (TREF), as described in Wild et al., *J. Polymer Sci. Poly. Phys. Ed.*, Vol. 20, p.441 (1982). A dilute solution of the ethylene polymer in a solvent such as 1,2,4-trichlorobenzene, at 1–4 mg/m, is loaded at high temperature onto a packed column. The column is then allowed to slowly cool down at 0.1° C./min. to ambient temperature in a controlled manner so that the ethylene polymer is crystallized onto the packing in the order of increasing branching (or decreasing crystallinity) with the decreasing temperature. The column is then heated in a controlled manner at 0.7° C./min to above 140° C. with a constant solvent flow at 2 ml/min through the column. The polymer fractions as they are eluted have decreasing branching (or increasing crystallinity) with the increasing temperature. An infrared concentration detector is used to monitor effluent concentrations. From the TREF temperature data, the branch frequency may be obtained for a given comonomer. Consequently, the main chain lengths between branches, expressed as $L_w$ and $L_n$, may be calculated as follows. $L_w$ is the weight average chain length between branches:

$L_w = \Sigma_i w_i L_i$, and $L_n$ is the number average chain length between branches:

$L_n = 1/\Sigma_i(w_i/L_i)$, wherein $w_i$ is the weight fraction of the polymer component i having an average backbone chain spacing $L_i$ between two adjacent branch points.

Optionally, the narrow comonomer distributions of the ethylene polymers may be characterized using Differential Scanning Calorimetry (DSC). With DSC, the melting temperature of a polymer is measured by a Differential Scanning Calorimeter, such as the DSC 2920 commercially available from Thermal Analysis Instruments, Inc. A polymer sample of about 5 mg sealed into an aluminum pen is first heated to 160° C. at a rate of 10° C./min and then cooled to −20° C. also at a rate of 10° C./min. This is followed by a second heating to 160° C. at a rate of 10° C./min. The peak melting temperature during the second melting endotherm is recorded as the melting point of the polymer.

The DSC-related properties that the present ethylene polymers preferably have are 1) a DSC Homogeneity Index, DSC-HI, of at least about 7, preferably at least about 9, and 2) a Crystallization Rate Constant, CRC, equal to or greater than 1.

The DSC-HI is defined as follows:

$$DSC\text{-}HI = |(T_{m\cdot heterog.} - T_m)/(T_{m\cdot heterog.} - T_{m\cdot homog.})| 10$$

wherein $T_m$ is the peak melting temperature of the ethylene polymer and $T_{m\cdot heterog.}$ and $T_{m\cdot homog.}$ are peak melting temperatures of representative compositionally heterogeneous and compositionally homogeneous polyethylene, respectively, having the same density as the ethylene polymer. The relationships between melting point and density used for the representative heterogeneous and homogeneous polymers are:

homogeneous: $T_m = -6023.5 + 12475.3(\text{density}) - 6314.6(\text{density})^2$
heterogeneous: $T_m = -49.6 + 189.1(\text{density})$ The CRC values of the ethylene polymers preferably are equal to or greater than 1. CRC is a relative measure of the rate of crystallization under a given set of conditions and is defined:

$$CRC\ (_{g/cc}) = (\text{density})(T_c/T_{1/2})$$

wherein $T_c$ is the peak crystallization temperature of the polymer, and $T_{1/2}$ is the temperature at which 50 weight percent of the crystallizable fractions in the polymer have crystallized. Both Tc and $T_{1/2}$ are determined from the recrystallization exotherm obtained with DSC measurements of the non-isothermal recrystallization processes. Polymer density is measured according to ASTM D-1505.

Another preferred characteristic of the present ethylene polymers is that they contain at least about 0.3 long chain branches per 1000 main chain carbon atoms. This further contributes to their excellent processability. Preferably, the ethylene polymers contain at least about 0.5 long chain branches per 1000 main chain carbon atoms. More preferably, the ethylene polymers contain at least about 0.7 long chain branches per 1000 main chain carbon atoms. Long-chain branching or LCB is measured by coupled size exclusion chromatography (SEC) with solution viscometry using the Waters 150C GPC instrument (Waters Corporation) with an on-line differential viscometer made by Viscotek Corporation using the same experimental conditions as described elsewhere for standard size exclusion chromatography. A polyethylene standard of known molecular weight distribution and intrinsic viscosity in 1,2,4-trichlorobenzene at 140° C., such as NBS 1475 or 1496, is used for obtaining the calibration. The LCB values are derived from the viscosity ratio of the branched polymer to linear polymer of same molecular weight. (See Mirabella, F. M., Jr.; and Wild, L., *Polymer Characterization*, Amer. Chem. Soc. Symp. Ser., 227, 1990, p. 23.) An epsilon value of 0.75 is used in relating the viscosity ratio to the ratio of mean-square radius of gyration of the branched polymer to linear polymer also at same molecular weight. (See Foster, G. N., MacRury, T. B., Hamielec, A. E., *Liquid Chromatography of Polymer and Related Materials II*, Ed.—J. Cazes and X. Delamere, Marcel Dekker, New York). This ratio of radii of gyration is used in the LCB calculations per the Zimm-Stockmayer relationship (Zimm, B. H. and Stockmayer, W. H., J. Chem. Phys., vol. 17, p. 1301, 1949), as described in *Developments in Polymer Characterization-4*, Dawkins, J. V., ed., Applied Science, Barking, 1993.

The ethylene polymers may be made by any conventional suspension, solution, slurry or gas phase polymerization process, using reaction conditions well known in the art. One reactor or several reactors in series may be employed. Gas phase polymerization is preferred using one or more fluidized bed reactors.

Similarly, catalysts compositions that may be used to make the ethylene polymers of the invention are any of those known for the polymerization of ethylene, such as those comprising one or more conventional Ziegler-Natta catalysts, as well as newer metallocene catalysts, both of which are well documented in the literature. The use of a mixed catalyst system within or among catalyst families may also be used to make the ethylene polymers of the invention.

It has, however, been discovered that a preferred process for preparing the ethylene polymers comprises contacting under gas phase polymerization conditions ethylene and optionally a higher alpha-olefin with a catalyst composition comprising: a) racemic and meso stereoisomers of a bridged metallocene catalyst containing two cycloalkadienyl ligands joined by a bridging linkage and complexed to a metal atom, each cycloalkadienyl ligand having facial chirality, and b) a cocatalyst selected from the group consisting of methylaluminoxane and modified methylaluminoxane.

Preferably the metal atom is titanium, zirconium, or hafnium. More preferably, the metal atom is zirconium.

Each of the cycloalkadienyl ligands of the bridged metallocene catalyst has facial chirality. Chirality is used to describe asymmetric molecules or ligands whose mirror images are non-superimposable (i.e., having "handedness"). In non-cyclic molecules, there is a chiral center. In the following case the chiral center is the carbon atom:

mirror

In cyclic systems a plane of chirality may exist, giving rise to facial chirality. To illustrate the concept of facial chirality, the indenyl ligand is used as an example. An indenyl ligand may be viewed as a cyclopentadienyl ligand containing two substituents that are connected to form a 6-carbon ring. An unsubstituted indenyl (i.e., a cyclopentadienyl ligand containing only the two substituents that form the 6-member ring) has no chirality. If a chiral substituent is attached to the indenyl ligand, the ligand is described in terms of the chirality of the substituent's chiral center. However, if one or more achiral substituents are attached to the indenyl ligand, and there is no mirror plane of symmetry, the substituted indenyl ligand (the cyclopentadienyl ligand containing the two substituents connected to form the 6-member ring plus one or more additional achiral substituents) is then said to have facial chirality:

2-methylindenyl ligand (achiral)

1-methylindenyl ligand (facially prochiral)

Thus, the 2-methylindenyl ligand above has no chirality (facial or otherwise) but 1-methylindenyl ligand has facial prochirality.

The term facial chirality implies a plane of chirality exists which incorporates the indenyl ligand. A metal (M) can coordinate to one of the two chiral faces of the 1-methylindenyl ligand, forming a basis for discrimination between the two prochiral faces. This forms the enantiomers:

enantiomers

When there are two such ligands in a molecule, each having facial chirality and coordinated to a metal, four possible stereisomers result: the metal can coordinate to the R face of each ligand (R, R') or the S face of each ligand (S, S') or it can coordinate to one of each face (R, S' and S, R'), wherein R, R', S, and S' refer to the absolute configurations of the ligands. The R, R' and S, S' stereoisomers are collectively called the racemic stereoisomers, while the R, S' and S, R' stereoisomers are called the meso stereoisomers.

When using the preferred catalyst composition comprising the bridged metallocene catalyst containing cycloalkadienyl ligands having facial chirality, it is necessary that both the racemic and meso stereoisomers be present in the catalyst composition in greater than trivial amounts. Preferably, both the racemic and meso stereoisomers are present during polymerization in an amount greater than about 6, more preferably 10, percent by weight of the total amount of bridged metallocene catalyst containing cycloalkadienyl ligands having facial chirality. Such amount is independent of the ratio of racemic stereoisomer to meso stereoisomer present in the bridged metallocene catalyst containing cycloalkadienyl ligands with facial chirality before it is combined with the methylaluminoxane or modified methylaluminoxane cocatalyst to form the activated catalyst composition.

In a preferred embodiment, the bridged metallocene catalyst containing two cycloalkadienyl ligands with facial chirality has the formula:

wherein $R_1$ to $R_8$ are the same or different monovalent substituents selected from alkyl, aryl, alkylaryl, arylalkyl, hydrogen, halogen, or hydrocarboxy and any two of $R_1$ to $R_8$ may be connected to form a ring of 4–8 atoms, such that if $R_1=R_4$ then $R_2 \neq R_3$, and if $R_2=R_3$ then $R_1 \neq R_4$, and if $R_5=R_8$ then $R_6 \neq R_7$, and if $R_6=R_7$ then $R_5 \neq R_8$, the symbol "=" denoting both chemical and stereochemical equivalence;

Q is a divalent substituent selected from alkylidene, dialkylsilylene, dialkylgermylene, and cycloalkylidene;

M is transition metal selected from Group 4, and is preferably zirconium or hafnium; and $X_1$ and $X_2$ are the same or different, and are monovalent ligands selected from alkyl, aryl, alkylaryl, arylalkyl, hydrogen, halogen, hydrocarboxy, aryloxy, dialkylamido, carboxylato, thiolato, and thioaryloxy.

The following compounds are illustrative but non-limiting examples of useful bridged metallocene catalysts containing two cycloalkadienyl ligands with facial chirality:

dimethylsilylenebis(indenyl)zirconium dichloride, ethylenebis(lindenyl)zirconium dichloride, dimethylsilylenebis(4,5,6,7-tetrahydroindenyl)zirconium dichloride, ethylenebis(4,5,6,7-tetrahydroindenyl)zirconium dichloride, dimethylsilylenebis(2-methylindenyl)zirconium dichloride dimethylsilylenebis(2-methyl-4,5,6,7-tetrahydroindenyl) zirconium dichloride, methylphenylsilylenebis(2-methylindenyl)zirconium dichloride, dimethylsilylenebis(2,4,7-trimethylindenyl)zirconium dichloride, ethylenebis(2-methylindenyl)zirconium dichloride, ethylenebis(2-methyl-4,5,6,7-tetrahydroindenyl) zirconium dichloride, dimethylsilylenebis(2-methylindenyl)zirconium dichloride, dimethylsilylenebis(2-methyl-4-phenylindenyl) zirconium dichloride, dimethylsilylenebis(2-methyl-4-isopropylindenyl) zirconium dichloride, dimethylsilylenebis(2-methyl-4-naphthylindenyl) zirconium dichloride, dimethylsilylenebis(2-methylindenyl)zirconium chloride phenoxide, dimethylsilylenebis(2-methylindenyl)zirconium diphenoxide, dimethylsilylenebis(2-methylindenyl)zirconium bis (dimethylamide), dimethylsilylenebis(2-methylindenyl)zirconium bis (benzoate), dimethylsilylenebis(2-methylindenyl)zirconium chloride ethoxide, dimethylsilylenebis(2-methylindenyl)zirconium diethoxide, dimethylsilylenebis(2-methylindenyl)zirconium bis (cyclohexanoxide), dimethylsilylenebis(2-methylindenyl)zirconium catecholate, dimethylsilylenebis(2,4-dimethylcyclopentadienyl) zirconium dichloride, dimethylsilylenebis(2-methyl-4-t-butylcyclopentadienyl) zirconium dichloride, and ethylenebis(2,4-dimethylcyclopentadienyl)zirconium dichloride.

Preferably, the bridged metallocene catalyst is dimethylsilylenebis(2-methylindenyl)zironium dichloride, which is defined by the formula immediately above when $R_1$ and $R_5$ are each methyl; $R_2$ and $R_6$ are each hydrogen; $R_3$ and $R_4$ are connected to form —CH=CH—CH=CH—; $R_7$ and $R_8$ are connected to form —CH=CH—CH=CH—; Q is dimethylsilylene; M is zirconium; and $X_1$ and $X_2$ are each chloride.

The bridged metallocene catalyst may be made by one of several methods. The method of manufacture is not critical. For example, see A. Razavi and J. Ferrara, *J. Organomet. Chem.*, 435, 299 (1992) and K. P. Reddy and J. L. Petersen, *Organometallics*, 8, 2107 (1989). One method comprises first reacting two equivalents of an optionally substituted cyclopentadiene with a metallic deprotonating agent such as an alkyllithium or potassium hydride in an organic solvent such as tetrahydrofuran, followed by reaction of this solution with a solution of one equivalent of a doubly-halogenated compound such as dichlorodimethylsilane. The resulting ligand is then isolated by conventional methods known to those skilled in the art (such as distillation or liquid chromatography), reacted with two equivalents of a metallic deprotonating agent as above, and then reacted with one equivalent of a tetrachloride of titanium, zirconium, or hafnium, optionally coordinated with donor ligand molecules such as tetrahydrofuran, in organic solvent. The resulting bridged metallocene catalyst is isolated by methods known to those skilled in the art such as recrystallization or sublimation.

Alternatively, the bridged metallocene catalyst may be produced by first reacting one equivalent of an optionally substituted cyclopentadiene with one equivalent of metallic deprotonating agent in an organic solvent as above, followed by reaction with one equivalent of a molecule containing an unsaturated five-carbon ring to which is attached an exocyclic group susceptible to nucleophilic attack, such as a dialkylfulvene. The reactive solution is next quenched with water and the ligand is isolated by conventional methods. One equivalent of the ligand is next reacted with two equivalents of metallic deprotonating agent as above and the resulting solution is in turn reacted with one equivalent of a tetrachloride of titanium, zirconium, or hafnium optionally coordinated with donor ligand molecules such as tetrahydrofuran, in organic solvent. The resulting bridged metallocene catalyst is isolated by methods known to those skilled in the art.

The cocatalyst is methylaluminoxane (MAO) or modified methylaluminoxane (MMAO). Aluminoxanes are well known in the art and comprise oligomeric linear alkyl aluminoxanes represented by the formula:

and oligomeric cyclic alkyl aluminoxanes of the formula:

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of methylaluminoxane, R* in the two formulas immediately above is methyl. For modified methylaluminoxane, R* is a mix of methyl and $C_2$ to $C_{12}$ alkyl groups, wherein methyl comprises about 20 to about 80 percent by weight of the R* groups.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

The amount of bridged metallocene catalyst and cocatalyst usefully employed in the catalyst composition may vary over a wide range. Preferably, the catalyst composition is present at a concentration sufficient to provide at least about 0.000001, preferably at least about 0.00001, percent by weight of transition metal based on the total weight of ethylene and other monomers. The mole ratio of aluminum atoms contained in the methylaluminoxane or modified methylaluminoxane to metal atoms contained in the bridged metallocene catalyst is generally in the range of about 2:1 to about 100,000:1, preferably in the range of about 10:1 to about 10,000:1, and most preferably in the range of about 30:1 to about 2,000:1.

The catalyst composition may be supported or unsupported. In the case of a supported catalyst composition, the bridged metallocene catalyst and the cocatalyst may be impregnated in or deposited on the surface of an inert substrate such as silicon dioxide, aluminum oxide, magnesium dichloride, polystyrene, polyethylene, polypropylene, or polycarbonate, such that the catalyst composition is between 1 and 90 percent by weight of the total weight of the catalyst composition and the support.

Polymerization is preferably conducted in the gas phase in a stirred or fluidized bed reactor, using equipment and procedures well known in the art. Preferably, superatmospheric pressures in the range of 1 to 1000 psi, preferably 50 to 400 psi, and most preferably 100 to 300 psi, and temperatures in the range of 30 to 130° C., preferably 65 to 110° C. are used. Ethylene and other monomers, if used, are contacted with an effective amount of catalyst composition at a temperature and a pressure sufficient to initiate polymerization.

Suitable gas phase polymerization reaction systems comprise a reactor to which monomer(s) and catalyst composition may be added, and that contain a bed of forming polyethylene particles. The invention is not limited to any specific type of gas phase reaction system. As an example, a conventional fluidized bed process is conducted by passing a gaseous stream containing one or more monomers continuously through a fluidized bed reactor under reaction conditions and in the presence of catalyst composition at a velocity sufficient to maintain the bed of solid particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream.

Conventional additives may be included in the process, provided they do not interfere with the epimerization of racemic and meso stereoisomers of the bridged metallocene catalyst.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds may be employed as scavenging agents for poisons to increase the catalyst activity. Examples of these compounds are metal alkyls, preferably aluminum alkyls, most preferably triisobutyl-aluminum tri-n-hexyl aluminum. Use of such scavenging agents is well known in the art.

The ethylene polymers may be blended with other polymers and resins as desired using techniques known in the art. In addition, various additives and agents, such as thermo- and photo-oxidation stabilizers including hindered phenolic antioxidants, hindered amine light stabilizers and aryl phosphites or phosphonites, crosslinkers including dicumyl peroxide, colorants including carbon blacks and and titanium dioxide, lubricants including metallic stearates, processing aids including fluoroelastomers, slip agents including oleamide or erucamide, film antiblock or release agents including controlled particle size talc or silica, blowing agents, flame retardants and other conventional materials may be mixed with the ethylene polymer of the invention as desired.

The ethylene polymers of the invention are useful for fabrication into a variety of finished articles such as films including clarity films and shrink films, extrusion coatings, wire and cable insulation and jacketing, crosslinked power cable insulation, molded articles made by injection molding, blow molding, or rotational molding, extrusions of pipe, tubing, profiles and sheeting, and insulating and semiconductive jacketing and/or shields. Methods of making such articles are well known in the art.

EXAMPLES

A series of ethylene polymers according to the invention (Examples 1–35) were compared with samples of known polyethylene for a variety of properties, including Polydispersity Index (PDI), Crystallizable Chain Length Distribution Index ($L_w/L_n$), melt index (MI), Relaxation Spectrum Index (RSI), and $(RSI)(MI^\alpha)$ when $\alpha$ is about 0.7. In addition, the long chain branching (LCB), DSC Homogeneity Index (DSC-HI), and Crystallization Rate Constant (CRC) were compared.

The ethylene polymers in Examples 1–35 were made using a 14 inch nominal diameter, gas phase, fluidized bed reactor having a bed height of 10 feet. The catalyst composition employed to make each of these Examples comprised the racemic and meso isomers of dimethylsilylenebis(2-methylindenyl)zironium dichloride and methylaluminoxane cocatalyst supported on silica.

Comparative Examples A–E were certain AFFINITY Polyolefin Plastomers commercially available from The Dow Chemical Company, as specified in Table 1.

Comparative Examples F–J were certain EXACT Linear Ethylene Polymers commercially available from Exxon Chemical as specified in Table 1.

Comparative Examples K–M were polyethylene made by high-pressure, free radical polymerization. These low density polyethylenes were produced in a high-pressure, tubular reactor using multiple organic initiators, pressures up to 3000 atmosphere and temperatures up to 320° C. The process used to produce these high-pressure, low density polyethylenes was similar to that described in Zabisky et al., Polymer, 33, No. 11, 2243, 1992.

Comparative Examples N and O were commercial, linear lowdensity polyethylenes made by the UNIPOL® process (Union Carbide Corp.) using a gas phase, fluidized bed reactor. These polyethylenes were Ziegler-Natta catalyzed ethylene copolymers of either butene-1 or hexene-1 as described in U.S. Pat. No. 4,302,565.

Comparative Examples P–R were low-density polyethylenes made by a gas phase, fluidized bed reaction in a staged reactor configuration using Ziegler-Natta catalysts.

Molecular Weights, Molecular Weight Distribution, and Long Chain Branching (LCB) were determined by size exclusion chromatography as follows. A WATERS 150C GPC chromatograph equipped with mixed-pore size columns for molecular weight measurements and a VISCOTEK 150R viscometer for on-line viscosity measurements were employed. For the size exclusion chromatograhy (SEC), a 25 cm long preliminary column from Polymer Labs having a 50 Å nominal pore size, followed by three 25 cm long Shodex A-80 M/S (Showa) columns to affect a molecular weight separation for linear ethylene polymer from about 200 to 10,000,000 Daltons were used. Both columns contain porous poly(styrene-divinyl benzene) packing. 1,2,4,-trichlorobenzene was used as the solvent to prepare the polymer solutions and the chromatographic eluent. All measurements were made at a temperature of 140±0.2° C. The analog signals from the mass and viscosity detectors were collected into a computer system. The collected data were then processed using standard software commercially available from several sources (Waters Corporation and Viscotek Corporation) for uncorrected molecular weight distribution. The calibration uses the broad MWD calibrant method. (See W. W. Yau, J. J. Kirkland and D. D. Bly, *Modern Size-Exclusion Liquid Chromatography*, Wiley, 1979, p. 289–313. For the latter, two MW related statistics such as number and weight average MW values must be known for the polymer calibrant. Based on the MW calibration, elution volume is converted to molecular weight for the assumed linear ethylene polymer.

A detailed discussion of the methodology of the SEC-Viscometry technique and the equations used to convert SEC and viscometry data into long-chain branching and corrected molecular weights is given in the article by Mirabella and Wild referred to above.

DSC and TREF measurements were made as described above.

Rheological measurements were done via dynamic oscillatory shear experiments conducted with a new model of the Weissenberg Rheogoniometer commercially available from TA Instruments. Experiments were run in parallel plate mode under a nitrogen atmosphere at 190° C. Sample sizes ranged from approximately 1100 to 1500 mm and were 4 cm in diameter. The frequency sweep experiments covered a frequency range of 0.1 to 100 $\sec^{-1}$ with a 2% strain amplitude. The torque response was converted by the TA Instruments rheometer control software to dynamic moduli and dynamic viscosity data at each frequency. Discrete relaxation spectra were fit to the dynamic moduli data for each sample using the IRIS® commercial software package.

Figure 1:
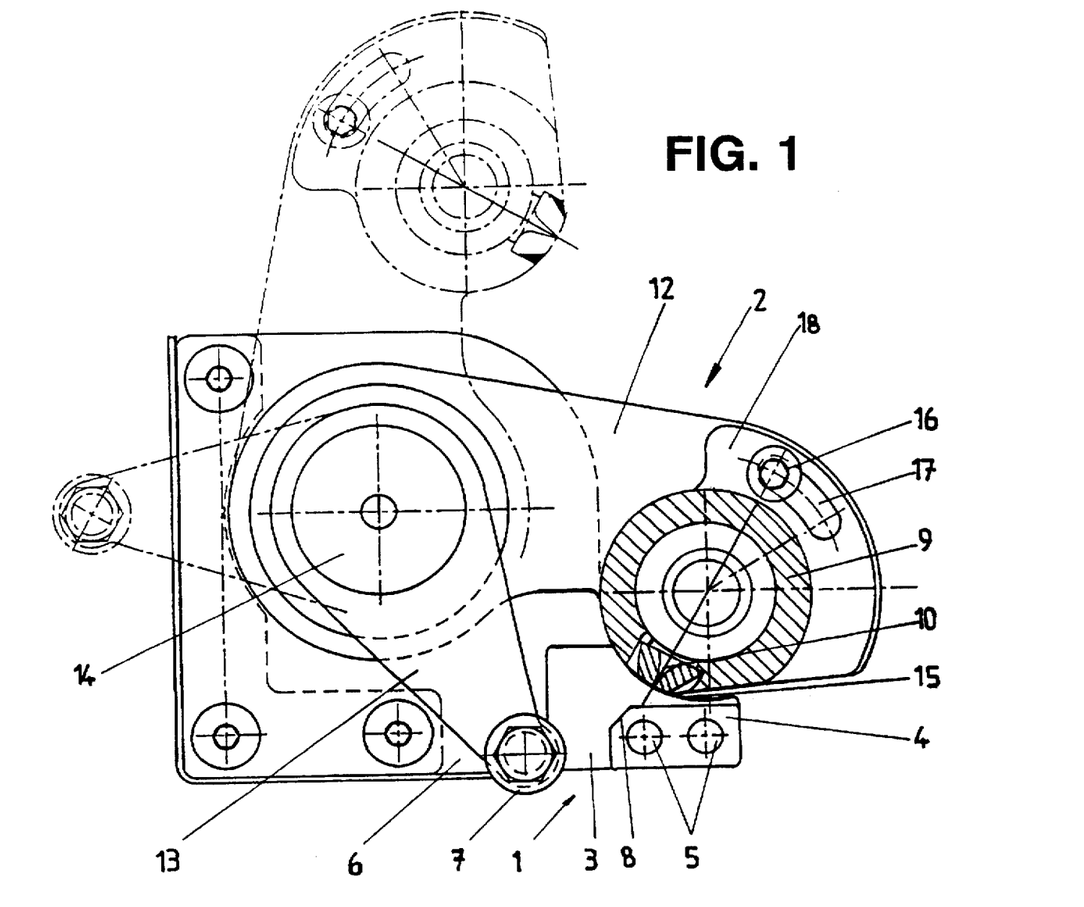
FIG. 1 is a plot of $(RSI)(MI^\alpha)$ versus melt index (MI) for ethylene polymers of the invention and various other polyethylenes.

The results, which are reported in Table 1, demonstrate that only the ethylene polymers of the invention exhibit the unique combination of a Polydispersity Index of at least about 3.0, a melt index, MI, and a Relaxation Spectrum Index, RSI, such that $(RSI)(MI^{\alpha})$ is greater than about 26 when $\alpha$ is about 0.7, and a Crystallizable Chain Length Distribution Index, $L_w/L_n$, less than about 3. FIG. 1 is a plot of the $(RSI)(MI^{\alpha})$ when $\alpha$ is about 0.7 versus MI data in Table 1.

Figure 2:
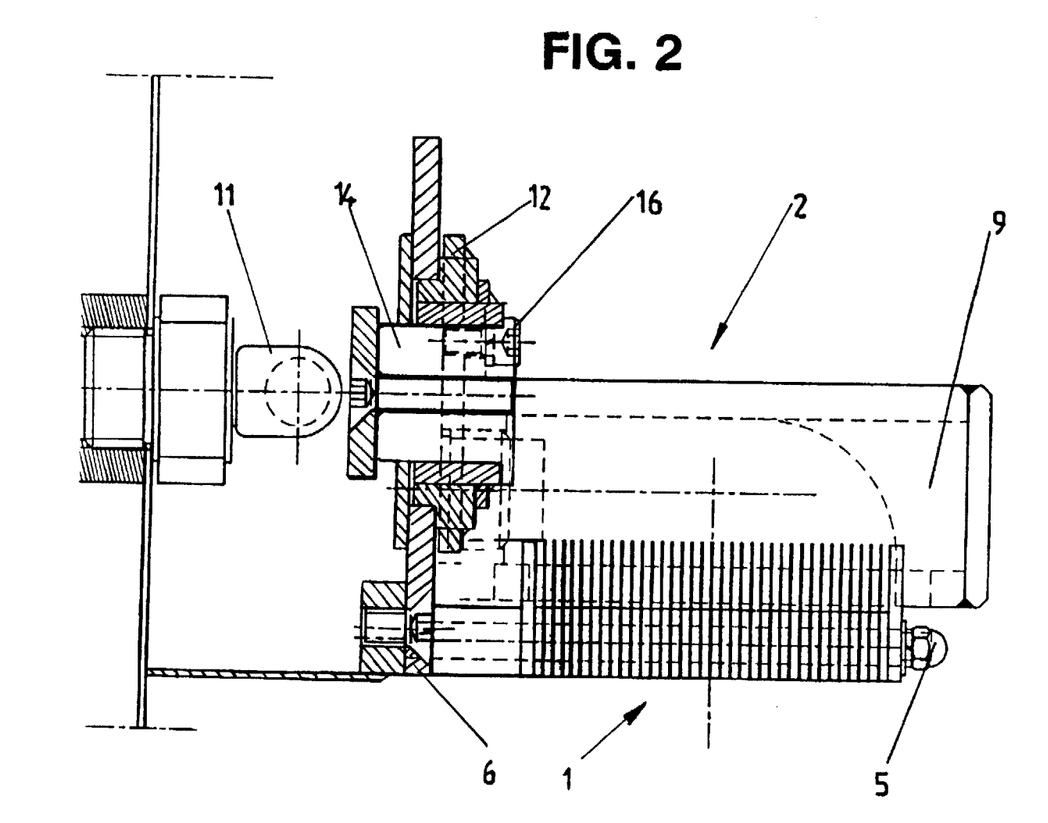
FIG. 2 is a plot of the Crystallization Rate Constant (CRC) versus density for ethylene polymers of the invention and various other polyethylenes.

In addition, only the ethylene polymers of the invention had CRC values equal to or greater than 1. FIG. 2 is a plot of the CRC versus density data in Table 1.

TABLE 1

| | | I2 | | | SEC Corrected | | | IV Intrinsic | LCB freq | SEC Uncorrected | | |
|---|---|---|---|---|---|---|---|---|---|---|---|---|
| Examples | Polymer | df/min. | MFR | Density ASTM | Mn | Mw | PDI | Viscosity (dL/g) | per 1000C | Mn-Uncor. | Mw-Uncor. | PDI-Uncor. |
| 1 | Invention | 2.63 | 51.66 | 0.9073 | 17265 | 97917 | 5.66 | 1.02 | 1.6 | 17100 | 66500 | 3.89 |
| 2 | Invention | 3.06 | 51.19 | 0.9252 | 15491 | 101788 | 6.57 | 1.02 | 1.4 | 15300 | 65700 | 4.29 |
| 3 | Invention | 2.26 | 57.21 | 0.9090 | 17059 | 102288 | 5.98 | 1.01 | 1.5 | 16900 | 67600 | 4 |
| 4 | Invention | 2.34 | 60.21 | 0.9293 | 14856 | 109186 | 7.35 | 1.05 | 1.4 | 15500 | 71700 | 4.63 |
| 5 | Invention | 2.29 | 52.87 | 0.9227 | 16038 | 106594 | 6.65 | 1.08 | 0.9 | 16700 | 71600 | 4.29 |
| 6 | Invention | 2.38 | 52.27 | 0.9240 | 16150 | 102100 | 6.32 | 1.07 | 0.7 | 16900 | 68200 | 4.04 |
| 7 | Invention | 2.09 | 50.46 | 0.9183 | 18722 | 102693 | 5.49 | 1.10 | 0.8 | 19700 | 70650 | 3.59 |
| 8 | Invention | 2.66 | 51.12 | 0.9241 | | | | | | | | |
| 9 | Invention | 1.97 | 50.49 | 0.9182 | | | | | | | | |
| 10 | Invention | 1.87 | 59.24 | 0.9095 | 16884 | 108938 | 6.44 | 1.00 | 2.2 | 16700 | 69600 | 4.17 |
| 11 | Invention | 1.34 | 65.05 | 0.9235 | | | | | | | | |
| 12 | Invention | 0.56 | 91.76 | 0.9231 | | | | | | | | |
| 13 | Invention | 0.30 | 118.00 | 0.9200 | 18577 | 150391 | 8.09 | 1.36 | 0.3 | 21200 | 104100 | 4.91 |
| 14 | Invention | 0.88 | 83.10 | 0.9210 | 16865 | 114738 | 6.8 | 1.18 | 0.8 | 18200 | 82900 | 4.55 |
| 15 | Invention | 1.71 | 62.43 | 0.9236 | 14708 | 88958 | 6.05 | 1.1 | 0.6 | 16500 | 69800 | 4.23 |
| 16 | Invention | 1.90 | 53.00 | 0.9240 | 15530 | 90206 | 5.81 | 1.05 | 0.9 | 17200 | 69500 | 4.04 |
| 17 | Invention | 1.99 | 51.00 | 0.9230 | 16150 | 102100 | 6.32 | 1.07 | 0.9 | | | |
| 18 | Invention | 1.52 | 56.00 | 0.9170 | 18026 | 89669 | 4.97 | 1.11 | 0.7 | 20300 | 72100 | 3.55 |
| 19 | Invention | 1.75 | 53.90 | 0.9165 | | | | | | 17500 | 71600 | 4.09 |
| 20 | Invention | 1.40 | 69.06 | 0.9096 | 15180 | 99053 | 6.52 | 1.05 | 0.8 | | | |
| 21 | Invention | 6.43 | — | 0.9230 | 9109 | 71112 | 7.81 | 0.92 | 1.0 | | | |
| 22 | Invention | 5.81 | — | 0.9230 | 10780 | 86100 | 7.99 | 0.8 | 4.5 | | | |
| 23 | Invention | 5.57 | 52.00 | 0.9235 | 10052 | 76732 | 7.63 | 0.91 | 1.2 | | | |
| 24 | Invention | 5.73 | 50.00 | 0.9230 | 10388 | 74763 | 7.2 | 0.94 | 1.2 | | | |
| 25 | Invention | 18.70 | 30.00 | 0.9210 | 8434 | 57640 | 6.83 | 0.79 | 2.3 | | | |
| 26 | Invention | 22.35 | 28.00 | 0.9205 | 10265 | 55901 | 5.45 | 0.76 | 4.5 | | | |
| 27 | Invention | 2.11 | 78.50 | 0.9207 | 10283 | 67387 | 6.55 | 1.28 | 0.0 | | | |
| 28 | Invention | 12.60 | 52.00 | 0.9300 | 9271 | 68797 | 7.44 | 0.95 | 2.5 | | | |
| 29 | Invention | 0.69 | 97.00 | 0.9133 | 16369 | 100178 | 6.12 | 1.18 | 0.8 | | | |
| 30 | Invention | 0.79 | 132.00 | 0.9306 | 11478 | 110509 | 9.63 | 1.18 | 0.5 | | | |
| 31 | Invention | 1.52 | 69.00 | 0.9218 | 15094 | 100188 | 6.64 | 1.14 | 0.3 | | | |
| 32 | Invention | 2.07 | 65.00 | 0.9184 | 13372 | 103089 | 7.71 | 1.08 | 1.3 | | | |
| 33 | Invention | 0.74 | 92.00 | 0.9203 | 13618 | 124234 | 9.12 | 1.24 | 0.5 | | | |
| 34 | Invention | 0.15 | 305.00 | 0.9167 | 18769 | 201369 | 10.73 | 1.6 | 0.3 | | | |
| 35 | Invention | 4.63 | 63.70 | 0.9235 | 9838 | 81425 | 8.28 | 1.03 | 0.5 | | | |
| A | AFFINITY FM1570 | 1.00 | 0.00 | 0.9150 | | 70783 | 2.3 | | | | | |
| B | AFFINITY HF1030 | 2.50 | 0.00 | 0.9350 | | 60059 | 2.16 | | | | | |
| C | AFFINITY PL1840 | 1.00 | 0.00 | 0.9080 | | 72588 | 2.22 | | | | | |
| D | AFFINITY PL1845 | 3.50 | 0.00 | 0.9100 | | 57486 | 2.15 | | | | | |
| E | AFFINITY PL1880 | 1.00 | 0.00 | 0.9020 | | 76481 | 2.3 | | | | | |
| F | EXACT-2010 | 1.55 | 0.00 | 0.9250 | 47187 | 95790 | 2.03 | | | | | |
| G | EXACT-3006 | 1.50 | 0.00 | 0.9090 | 47525 | 84120 | 1.77 | | | | | |
| H | EXACT-4001 | 4.00 | 0.00 | 0.8950 | 32631 | 66240 | 2.03 | | | | | |
| I | EXACT-4003 | 9.20 | 0.00 | 0.8950 | 27395 | 54790 | 2 | | | | | |
| J | EXACT-4024 | 3.80 | 0.00 | 0.0000 | | | | | | | | |
| K | HP-LDPE | 0.10 | 0.00 | 0.9200 | 20764 | 125000 | 6.02 | | | | | |
| L | HP-LDPE | 0.20 | 0.00 | 0.9210 | 18212 | 124390 | 6.83 | | 2.7000 | | | |
| M | HP-LDPE | 1.90 | 0.00 | 0.9230 | 16207 | 70500 | 4.35 | | 1.9 | | | |
| N | LLDPE | 1.00 | 0.00 | 0.9180 | | | | | | | | |
| O | LLDPE | 1.00 | 0.00 | 0.9180 | | | | | | | | |
| P | Staged Reactor PE | 0.80 | 0.00 | 0.9230 | | | | | | | | |
| Q | Staged Reactor PE | 0.70 | 0.00 | 0.9210 | | | | | | | | |
| R | Staged Reactor PE | 0.00 | 0.00 | 0.0000 | | | | | | | | |

TABLE 1-continued

Part 2

| Examples | Polymer | Tm (C) | Tc (C) | Tm, heterog | Tm, homog | DSC-HI 10 = homog./ 0 = heterog. | CRC Index | Lw/Ln | RSI (sec) at 190° C. | (RSI)(MI*) at ∝ = 0.74 and 190° C. |
|---|---|---|---|---|---|---|---|---|---|---|
| 1 | Invention | 93.07 | 81.24 | 121.97 | 97.20 | 10.0 | | 2.30 | 16.53 | 36.23 |
| 2 | Invention | 113.14 | 103.55 | 125.36 | 113.38 | 10.0 | 1.021 | 1.98 | 18.53 | 39.57 |
| 3 | Invention | 95.16 | 84.04 | 122.29 | 98.91 | 10.0 | | 1.64 | 19.81 | 37.77 |
| 4 | Invention | 115.95 | 106.10 | 126.13 | 116.52 | 10.0 | 1.023 | 1.61 | 26.88 | 43.15 |
| 5 | Invention | 111.35 | 101.82 | 124.88 | 111.36 | 10.0 | 1.026 | 1.53 | 22.28 | 34.35 |
| 6 | Invention | 112.32 | 102.64 | 125.13 | 112.42 | 10.0 | 1.024 | 1.45 | 21.35 | 35.58 |
| 7 | Invention | 108.13 | 97.91 | 124.05 | 107.62 | 9.7 | 1.022 | 1.26 | 20.54 | 31.67 |
| 8 | Invention | 111.64 | 102.70 | 125.15 | 112.50 | 10.0 | 1.026 | 1.67 | 21.40 | 34.34 |
| 9 | Invention | 108.12 | 97.97 | 124.03 | 107.54 | 9.6 | 1.021 | 1.90 | 21.59 | 29.10 |
| 10 | Invention | 96.41 | 85.69 | 122.39 | 99.41 | 10.0 | | 1.77 | 23.97 | 33.89 |
| 11 | Invention | 111.75 | 102.96 | 125.03 | 112.02 | 10.0 | 1.025 | 1.63 | 36.91 | 34.15 |
| 12 | Invention | 112.48 | 103.38 | 124.96 | 111.69 | 9.4 | 1.016 | 2.04 | 63.88 | 26.30 |
| 13 | Invention | 113.46 | 100.82 | | | | | 2.05 | | |
| 14 | Invention | 113.08 | 100.22 | | | | | 1.63 | | |
| 15 | Invention | 112.86 | 100.22 | 125.05 | 112.10 | 9.4 | | 1.82 | | |
| 16 | Invention | 112.14 | 99.81 | | | | | 1.59 | | |
| 17 | Invention | | | | | | | 1.45 | 24.08 | 40.14 |
| 18 | Invention | 108.45 | 95.81 | | | | | 1.67 | | |
| 19 | Invention | | | | | | | | | |
| 20 | Invention | 96.27 | 92.05 | 122.41 | 99.51 | 10.0 | | 1.60 | | |
| 21 | Invention | | | | | | | | 12.63 | 49.59 |
| 22 | Invention | | | | | | | | 11.49 | 41.98 |
| 23 | Invention | | | | | | | | 12.51 | 44.52 |
| 24 | Invention | | | | | | | | 14.73 | 53.12 |
| 25 | Invention | | | | | | | | 4.28 | 37.06 |
| 26 | Invention | | | | | | | | 4.59 | 45.41 |
| 27 | Invention | 113.58 | 101.29 | | | | 1.039 | 1.41 | 23.20 | 40.08 |
| 28 | Invention | 117.79 | 106.66 | | | | 1.045 | 2.27 | 6.93 | 44.84 |
| 29 | Invention | 114.19 | 101.34 | | | | 1.119 | 1.94 | 41.32 | 31.77 |
| 30 | Invention | 118.89 | 106.88 | | | | 1.003 | 2.22 | 65.25 | 55.36 |
| 31 | Invention | 112.05 | 100.00 | | | | 1.007 | 1.80 | | |
| 32 | Invention | 110.18 | 98.47 | | | | 1.027 | 1.85 | | |
| 33 | Invention | 112.00 | 99.64 | | | | 1.011 | 1.67 | 64.47 | 49.57 |
| 34 | Invention | 107.85 | 98.41 | | | | 1.014 | 2.34 | 287.08 | 87.67 |
| 35 | Invention | 110.94 | 99.86 | | | | 1.042 | 2.34 | 28.80 | 88.70 |
| A | AFFINITY FM1570 | 110.90 | 94.77 | 123.43 | 104.66 | 6.7 | 0.936 | 1.23 | 7.43 | 7.43 |
| B | AFFINITY HF1030 | 125.20 | 111.12 | 127.21 | 120.52 | 3.0 | 0.947 | 3.33 | 4.98 | 9.79 |
| C | AFFINITY PL1840 | 105.50 | 89.01 | 122.10 | 97.91 | 6.9 | 0.926 | 1.59 | 8.24 | 8.24 |
| D | AFFINITY PL1845 | 104.80 | 86.06 | 122.48 | 99.90 | 7.8 | 0.926 | 1.28 | 3.52 | 8.86 |
| E | AFFINITY PL1880 | 100.80 | 82.29 | 120.97 | 91.64 | 6.9 | 0.922 | 1.27 | 6.21 | 6.21 |
| F | EXACT-2010 | 118.40 | 104.19 | 125.32 | 113.22 | 5.7 | 0.943 | 1.41 | 1.75 | 2.42 |
| G | EXACT-3006 | 104.40 | 87.11 | 122.29 | 98.91 | 7.7 | 0.925 | 1.38 | | |
| H | EXACT-4001 | 82.90 | 63.41 | 119.64 | 83.74 | 10.0 | 0.904 | | | |
| I | EXACT-4003 | 83.60 | 65.61 | 119.64 | 83.74 | 10.0 | 0.955 | 1.10 | | |
| J | EXACT-4024 | | | | | | | | | |
| K | HP-LDPE | | | | | | | | 126.51 | 23.18 |
| L | HP-LDPE | 108.90 | 96.05 | 124.56 | 109.95 | 10.0 | 0.980 | 1.16 | 13.30 | 21.35 |
| M | HP-LDPE | 109.20 | 97.38 | 124.94 | 111.61 | 10.0 | 0.982 | 1.42 | 44.49 | 13.59 |
| N | LLDPE | 121.70 | 106.44 | 123.99 | 107.36 | 1.4 | 0.972 | 7.86 | 3.26 | 3.26 |
| O | LLDPE | 123.70 | 110.16 | 123.99 | 107.36 | 0.2 | 0.983 | 14.03 | 4.79 | 4.79 |
| P | Staged Reactor PE | | | | | | | | 7.36 | 6.25 |
| Q | Staged Reactor PE | | | | | | | | 10.69 | |
| R | Staged Reactor PE | | | | | | | | | |

Referring now to Table 2, the ethylene polymers of Examples 1–12, as well as Comparative Examples A, C, E, F, L, M, O and P were each compared for their extrudability under blown film processing comditions.

The ethylene polymers of the invention were each dry blended with 1000 ppm IRGANOX B-900 (Ciba-Geigy Corporation) and compounded in a 1–½ inch Killion Extruder with a standard LLDPE mixing screw (³⁰⁄₁ length to diameter) at a rate of 40 lb/hr (~90 rpm) with a set die temperature of 410° F. The pelleted ethylene polymers and the Comparative Example polyethylenes were extruded into blown films using typical operating conditions. The blown film extrusion equipment consisted of a 1½ inch diameter Sterling extruder equipped with 24:1 L/D, general purpose LLDPE screw (constant pitch, decreasing depth, Maddox mixing-head screw) and a spiral pin die.

The specifics of the dies used and the extrusion speed and temperature conditions were as follows:

| Examples | Screw Speed | Temperature Profile, °F. | Die |
|---|---|---|---|
| 1–12, M | 98 rpm | 350 flat temp. profile | 2.2 inch spiral die, 30 mil die gap, with 2.14 inch die diameter and 0.312 inch die length |
| L | 90 rpm | 410, 425, 460, 460, 460 460, 460 | 2.2 inch spiral die, 30 mil die gap, with 2.14 inch die diameter and 0.312 inch die length |
| A, C, E, F, &N | 90 rpm | 380, 380, 385, 390, 400 400, 400 | 3 inch spiral die, 80 mil die gap, with 2.84 inch die diameter and 1.26 inch die length |
| P | 90 rpm | 380, 380, 385, 390, 400, 400, 400 | 2.2 inch spiral die, 30 mil die gap, with 2.14 inch die diameter and 0.312 inch die length |

Table 2 show the head pressure and amperage that was required to extrude each of the resins tested, as well as the head pressure and amperage normalized with respect to the die rate, so that direct comparisons may be made. The normalized data in Table 2 shows that the head pressures and amps required in extruding the ethylene polymers of the invention were much less than those needed to extrude the Comparative Examples when compared at similar melt index. Further, the ethylene polymers of the invention showed excellent drawdown and extrusion ease compared to high pressure, low density polyethylene.

Table 2

| | | Blown Film Processing | | | | |
|---|---|---|---|---|---|---|
| Examples | Polymer | Head Pressure | Amps | Die Rate lbs/hr/in | Press/ DR | Amp/ DR |
| 1 | Invention | 1390.0 | 6.00 | 5.40 | 257.41 | 1.11 |
| 2 | Invention | 1200.0 | 7.20 | 6.60 | 181.82 | 1.09 |
| 3 | Invention | 1390.0 | 6.00 | 5.10 | 272.55 | 1.18 |
| 4 | Invention | 1390.0 | 7.50 | 6.50 | 213.85 | 1.15 |
| 5 | Invention | 1550.0 | 8.20 | 6.50 | 238.46 | 1.26 |
| 6 | Invention | 1500.0 | 7.70 | 6.50 | 230.77 | 1.18 |
| 7 | Invention | 1700.0 | 7.50 | 6.50 | 261.54 | 1.15 |
| 8 | Invention | 1500.0 | 7.90 | 6.60 | 227.27 | 1.20 |
| 9 | Invention | 1700.0 | 7.20 | 6.30 | 269.84 | 1.14 |
| 10 | Invention | 1590.0 | 6.20 | 5.40 | 294.44 | 1.15 |
| 11 | Invention | 1450.0 | 7.10 | 6.70 | 216.42 | 1.06 |
| 12 | Invention | 2100.0 | 9.80 | 6.60 | 318.18 | 1.48 |
| A | AFFINITY FM1570 | 1900.0 | 12.2000 | 3.5000 | 542.86 | 3.49 |
| C | AFFINITY PL1840 | 1960.0 | 11.6000 | 2.8600 | 685.31 | 4.06 |
| E | AFFINITY PL1880 | 1960.0 | 11.7000 | 2.9200 | 671.23 | 4.01 |
| F | EXACT-2010 | 2560.0 | 17.2000 | 3.6300 | 705.23 | 4.74 |
| L | HP-LDPE | 2100.0 | 8.2000 | 5.9000 | 355.93 | 1.39 |
| M | HP-LDPE | 2000.0 | 7.9000 | 5.9000 | 338.98 | 1.34 |
| N | LLDPE | | | | | |
| O | LLDPE | 2650.0 | 14.2000 | 3.3900 | 781.71 | 4.19 |

Table 2-continued

| | | Blown Film Processing | | | | |
|---|---|---|---|---|---|---|
| Examples | Polymer | Head Pressure | Amps | Die Rate lbs/hr/in | Press/ DR | Amp/ DR |
| P | Staged Reactor PE | 2200.0 | 9.0000 | 5.7300 | 383.94 | 1.57 |

We claim:

1. An ethylene polymer having:

a Polydispersity Index of at least 3.0;

a melt index, MI, and a Relaxation Spectrum Index, RSI, such that $(RSI)(MI^{0.7})$ is greater than about 26;

a Crystallizable Chain Length Distribution Index, $L_w/L_n$, less than about 3; and at least about 0.3 long chain branches per 1000 main chain carbon atoms.

2. The ethylene polymer of claim 1, wherein the Polydispersity Index is at least about 4.0.

3. The ethylene polymer of claim 1, wherein $L_w/L_n$ is less than about 2.

4. The ethylene polymer of claim 1, further having a DSC Homogeneity Index, DSC-HI, of at least about 7.

5. The ethylene polymer of claim 4 having a DSC-HI of at least about 9.

6. The ethylene polymer of claim 1, further having a Crystallizable Rate Constant, CRC, equal to or greater than 1.

7. The ethylene polymer of claim 1 containing about 1 to about 40 percent by weight of a linear or branched alpha-olefin having from 3 to about 20 carbon atoms.

8. The ethylene polymer of claim 1 containing about 1 to about 40 percent by weight of a comonomer selected from propylene, 1-butene 1-hexene, 4-methyl-1-pentene, 1-octene and mixtures thereof.

9. The ethylene polymer of claim 1 containing about 1 to about 40 percent by weight of a comonomer selected from propylene, linear or branched alpha-olefins having from 4 to about 20 carbon atoms, and linear, branched or cyclic hydrocarbon dienes, and mixtures thereof.

10. The ethylene polymer of claim 1, wherein said ethylene polymer is a homopolymer.

11. Film comprising the ethylene polymer of claim 1.

12. Clarity film comprising the ethylene polymer of claim 1.

13. Shrink film comprising the ethylene polymer of claim 1.

14. Extrusion coated layer comprising the ethylene polymer of claim 1 on substrate.

15. Wire and cable insulation and/or jacketing comprising the ethylene polymer of claim 1.

16. Crosslinked, power cable insulation comprising the ethylene polymer of claim 1.

17. Molded article comprising the ethylene polymer of claim 1.

18. Insulating jackets and/or semi-conductive jackets and/or shields comprising the ethylene polymer of claim 1.

* * * * *

UNITED STATES PATENT AND TRADEMARK OFFICE
CERTIFICATE OF CORRECTION

PATENT NO.   : 5,798,427
DATED        : Aug. 25, 1998
INVENTOR(S)  : George Norris Foster, et al It is certified that error appears in the above-identified patent and that said Letters Patent is hereby corrected as shown below:   In the Drawing:

The drawing sheets, consisting of Figs, 1-3, should be deleted to be replaced with the drawings sheets, consisting of Figs. 1-2, as shown on the attached pages.

Signed and Sealed this

Seventeenth Day of August, 1999

*Attest:*

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,798,427

DATED : August 25, 1998

INVENTOR(S) : Foster et al.

Figure 3:
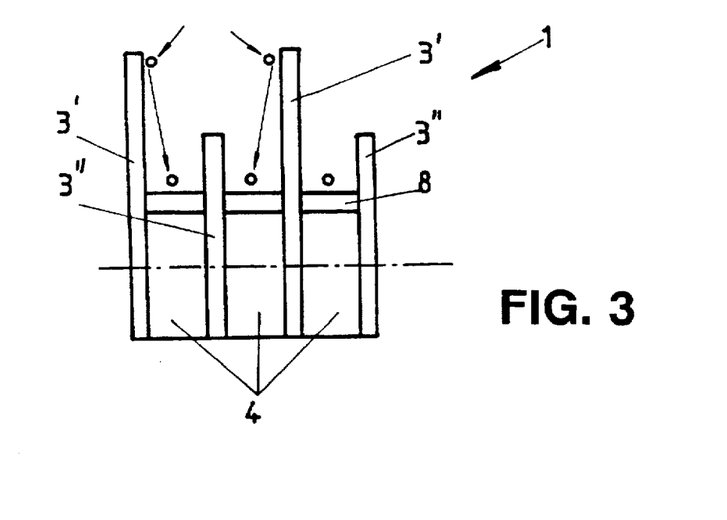

It is certified that error appears in the above-identified patent and that said Letters Patent is hereby corrected as shown below:

Substitute the following Figures 1 and 2 for Figures 1, 2 and 3.

FIG. 1

UNITED STATES PATENT AND TRADEMARK OFFICE
CERTIFICATE OF CORRECTION

PATENT NO. : 5,798,427

DATED : August 25, 1998

INVENTOR(S) : Foster et al.

It is certified that error appears in the above-identified patent and that said Letters Patent is hereby corrected as shown below:

FIG. 2

Signed and Sealed this

Seventeenth Day of August, 1999

Attest:

Q. TODD DICKINSON

*Attesting Officer*   *Acting Commissioner of Patents and Trademarks*